(12) United States Patent
Jalali et al.

(10) Patent No.: US 11,027,320 B2
(45) Date of Patent: Jun. 8, 2021

(54) SYSTEM AND METHODS FOR LARGE SCALE COPPER EXTRACTION

(71) Applicant: Colorado State University Research Foundation, Fort Collins, CO (US)

(72) Inventors: Sam Jalali, Fort Collins, CO (US); Terry E. Engle, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 277 days.

(21) Appl. No.: 16/188,846

(22) Filed: Nov. 13, 2018

(65) Prior Publication Data

US 2019/0151915 A1    May 23, 2019

Related U.S. Application Data

(60) Provisional application No. 62/587,623, filed on Nov. 17, 2017.

(51) Int. Cl.
| | | |
|---|---|---|
| *B09C 1/00* | (2006.01) | |
| *B09C 1/08* | (2006.01) | |
| *A62D 3/11* | (2007.01) | |

(52) U.S. Cl.
CPC ............. *B09C 1/085* (2013.01); *A62D 3/11* (2013.01); *B09C 1/00* (2013.01)

(58) Field of Classification Search
CPC ... B09C 1/085; B09C 1/00; A62D 3/11; C02F 2103/06; C02F 2103/42; C25C 5/02
See application file for complete search history.

(56) References Cited

U.S. PATENT DOCUMENTS

| | | | | | |
|---|---|---|---|---|---|
| 2,673,179 | A | * | 3/1954 | Duncan | .............. C25C 5/02 205/74 |
| 9,776,888 | B1 | * | 10/2017 | Kurani | .............. C02F 1/66 |
| 2006/0243595 | A1 | * | 11/2006 | Henuset | .............. C25C 5/02 205/143 |

OTHER PUBLICATIONS

Schlesinger, M.E. et al. (2011). Chapter 17 Electrowinning. Extractive Metallurgy of Copper, Fifth Edition, pp. 349-372. Oxford, Great Britain: Elsevier Ltd.
Jalali S, Engle T. Extracting Copper from Dairy Footbaths to Prevent Heavy Metal Bioaccumulation in Agriculture Land. Colorado State University poster presentation Nov. 15, 2016.

* cited by examiner

*Primary Examiner* — Arun S Phasge
(74) *Attorney, Agent, or Firm* — Polsinelli PC

(57) ABSTRACT

A method for extracting an elemental metal from agricultural waste including collecting a sample of the waste and performing an electrochemical extraction on the waste to producing a metal precipitate and a byproduct. The method further including collecting the metal precipitate and byproduct produced via the electrochemical extraction for further reaction, recycling, sale, or reuse.

19 Claims, 8 Drawing Sheets

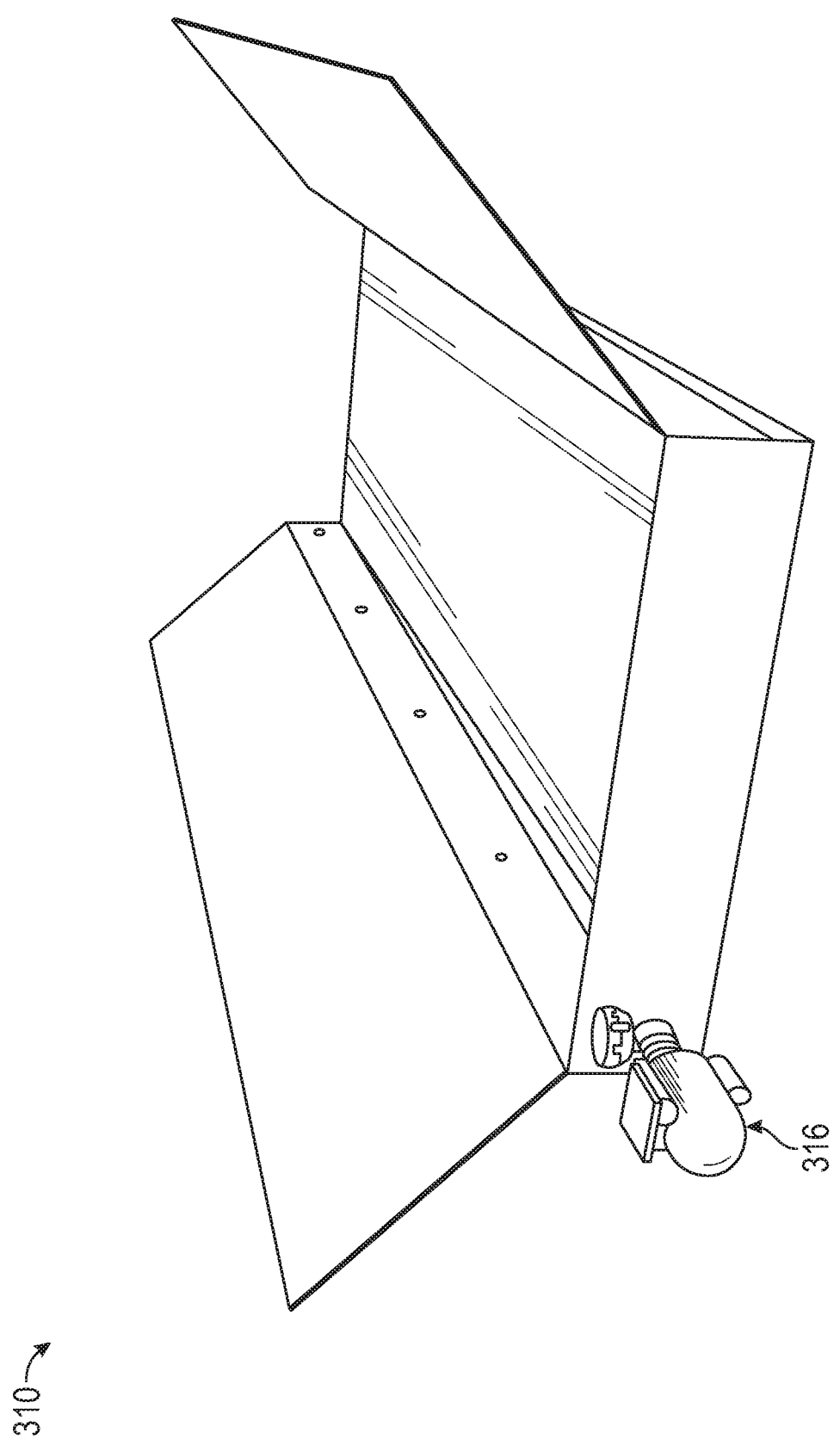

SYSTEM AND METHODS FOR LARGE SCALE COPPER EXTRACTION

CROSS-REFERENCE TO RELATED APPLICATIONS

This application claims priority to provisional Application No. 62/587,623, filed Nov. 17, 2017, the entire content of which is incorporated herein by reference.

FIELD

The present disclosure relates generally to removing or reusing byproducts from an antibacterial solution. In particular, the present disclosure relates to a method for large scale removal of elemental metal from antibacterial solutions used, for example, in agriculture.

BACKGROUND

Heavy metals contamination of ground soil can pose hazardous risks to humans, animals, and the ecosystem as whole. The most common heavy metals found in contaminated ground soil include, but are not limited to, lead (Pb), chromium (Cr), arsenic (As), zinc (Zn), cadmium (Cd), copper (Cu), mercury (Hg), and nickel (Ni). Particularly, large industry farms use various materials in daily operations which can include hazardous materials. These materials can leech into the soil and/or water sources on or near such industrial farms causing widespread heavy metal contamination.

Specifically, heavy metals contamination of ground soil can affect nearby populations in various ways, including, but not limited to, through direct ingestion on contact with contaminated soil, consuming food that has contacted the contaminated soil (i.e., soil-plant-human or soil-plant-animal-human), drinking of contaminated ground water, reduction of food quality via phytotoxicity, reduction in land usability for agricultural production causing food insecurity, and land tenure problems. As such contamination issues can be increasingly dangerous when present on land used in the farming industry if the contaminates are unable to be removed from the soil and water.

SUMMARY OF INVENTION

In one aspect, the disclosure relates to a method for extracting an elemental metal from an antibacterial solution, the method comprising: obtaining at least 100 liters of an antibacterial solution; performing an electrochemical extraction on the antibacterial solution; producing a metal precipitate and a byproduct; and collecting the metal precipitate. In some embodiments, the sample of the antibacterial solution is from about 100 liters to about 1000 liters.

In some aspects, the antibacterial solution is selected from the group comprising a copper sulfate ($CuSO_4$) solution, a zinc chloride ($ZnCl_2$) solution, and a zinc sulfate ($ZnSO_4$) solution. In further aspects, the antibacterial solution is the copper sulfate ($CuSO_4$) solution. In another aspect, the metal precipitate is an elemental copper (Cu) and the byproduct is a sulfuric acid solution ($H_2SO_4$).

In a further aspect, the method further comprises neutralizing the byproduct. In some embodiments the byproduct is a sulfuric acid solution ($H_2SO_4$) and the method may comprise neutralizing the sulfuric acid solution ($H_2SO_4$). In another aspect, the neutralization step further comprises introducing a basic material. In some aspects, a basic material is introduced into a sulfuric acid solution ($H_2SO_4$), wherein the basic material is selected from the group comprising a sodium hydroxide (NaOH) solution and a calcium carbonate ($CaCO_3$). In some aspects, the basic material is calcium carbonate ($CaCO_3$).

In another aspect, the method may further comprise converting the sulfuric acid solution ($H_2SO_4$) to gypsum ($CaSO_4 \cdot 2H_2O$).

In another aspect, the method may further comprise replacing the copper (Cu) precipitate into the sulfuric acid solution ($H_2SO_4$); introducing an oxidizing agent into the copper (Cu) and the sulfuric acid ($H_2SO_4$); and regenerating a fresh copper sulfate ($CuSO_4$). In an aspect, the oxidizing agent may be hydrogen peroxide ($H_2O_2$).

In an aspect, the disclosure relates to a system for extracting an elemental metal from a solution, the system comprising: a basin operable to contain an antibacterial solution; one or more filtration tanks coupled with and operable to receive the antibacterial solution from the basin; an electrolysis chamber coupled with the one or more filtration tanks; and a storage tank for holding a material.

In a further aspect, the system further comprises a computing device coupled with each of the basin, the one or more filtration tanks, the electrolysis chamber and the storage tank. In some aspects, the computing device further comprises a processor and a memory coupled with the processor and storing instructions thereon which, when executed by the processor, cause the processor to: track a usage of the antibacterial solution in the basin, pump the antibacterial solution from the basin to the one or more filtration tanks, perform an electrochemical extraction on the antibacterial solution; and produce a metal precipitate and a byproduct in the electrolysis chamber. In some aspects the instructions may further cause the processor to: extract the metal precipitate; pump the byproduct into the storage tank; and neutralize the byproduct. In further aspects, the instructions may cause the processor to regenerate the antibacterial solution by introduce an oxidizing agent into the electrolysis chamber. In another aspect, the instructions may further cause the processor to pump the antibacterial solution from the basin to the one or more filtration tanks when the antibacterial solution in the basin has been used by 150 subjects.

In another aspect, the basin may further comprise: a pump coupled with a valve and operable to pump the antibacterial solution from the basin to the one or more filtration tanks; an infrared sensor operable to monitor usage of the basin; and a plurality of nozzles operable to clean the basin between uses.

In some aspects, the basin is a footbath.

In another aspect, the one or more filtration tanks may further comprise a plurality of mesh baskets, each of the plurality of mesh baskets having a different size mesh.

In an aspect, the electrolysis chamber may further comprise one or more cathodes, one or more anodes, and a power supply source.

BRIEF DESCRIPTION OF THE DRAWINGS

Implementations of the present technology will now be described, by way of example only, with reference to the attached figures, wherein:

FIGS. 4A-4C illustrate different views of an exemplary footbath compatible with the system of FIG. 3;

DETAILED DESCRIPTION

Figure 1:
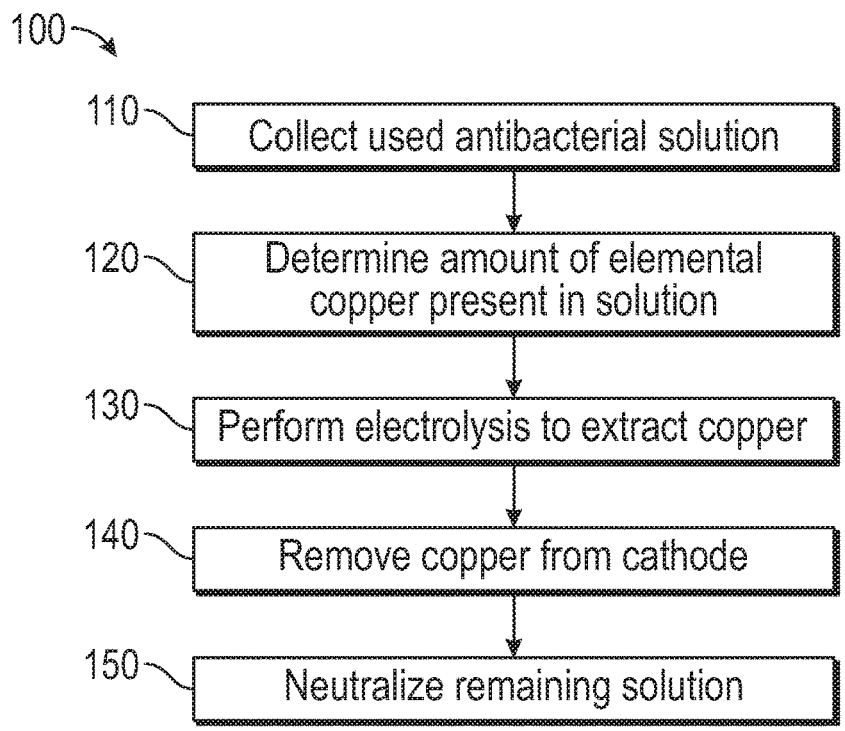
FIG. 1 illustrates an exemplary method for extracting copper from a used antibacterial copper sulfate solution.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Numerous specific details are set forth in the present disclosure in order to provide a thorough understanding of the embodiments described herein. However, it will be understood by those of ordinary skill in the art that the embodiments described herein can be practiced without these specific details. In other instances, methods, systems, and devices have not been described in detail so as not to obscure the related relevant feature being described. The description is not to be considered as limiting the scope of the embodiments described herein.

Several definitions that apply throughout this disclosure will now be presented. All numeric values used herein are assumed to be modified by the term "about," whether or not explicitly indicated. The term "about" generally refers to a range of numbers that one of skill in the art would consider equivalent to the recited value (i.e., having the same function or result). In at least some instances, the term "about" may include those numbers that are equivalent to those specified if rounded to the nearest significant figure. The terms "comprising," "including" and "having" are used interchangeably in this disclosure. The terms "comprising," "including" and "having" mean to include, but not necessarily be limited to the things so described.

The term "electrochemical extraction" as used herein generally refers to a technique in which an anode and a cathode are used to pass a high current through a solution in order to extract a desired product. The terms "electrolysis" as used herein generally refers to a technique that uses a direct electrical current to drive an otherwise non-spontaneous chemical reaction. The term "electrowinning" as used herein generally refers to the electrodeposition of metals from their ores that have been put into a solution via a leaching process. Electrochemical extractions, electrolysis reactions, and electrowinning reactions described herein are conducted in a manner consistent with that known in the art.

Several materials which can contribute to harmful waste are used in farming routines every day. For example, the dairy industry has increased exponentially in the past 150 years, along with that the number of cattle on each farm has increased as well. In 2015 an analysis of domestic dairy farms in the United States indicated that there were roughly 9.345 million dairy cattle in the U.S. As the number of dairy cattle increases, the rate of diseases and lameness contracted by the cattle. Such diseases can include, but are not limited to, lameness, digital dermatitis, hairy warts, foot rot, ulcers, and other hoof-diseases. Several methods for treating these diseases are known including, but not limited to, changing the stall size, flooring, distance the cattle must walk, cleaning the flooring, or medical preventative measures.

In particular, lameness, including digital dermatitis and foot rot, can be treated, or prevented, using antibacterial solutions designed to limit bacterial growth on hooves. There are various antibacterial solutions which are commonly used to treat such diseases, including but not limited to, formaldehyde, copper sulfate, zinc sulfate, formalin, soap, and other antibiotic solutions. The two most frequently used materials are formaldehyde and copper sulfate. While formaldehyde is extremely efficient in preventing lameness, it is a known carcinogen and can be seriously harmful to farm workers. Additionally, after such antibacterial solutions are used they can be released in to a premise lagoon; the presence of formaldehyde can alter the microbial population in the lagoon causing further ecological problems. As such, most farms use copper sulfate in an antibacterial solution.

In particular, a copper sulfate solution can be created which provides antibacterial properties when applied to the hoof. One method for applying the solution includes creating a footbath that the animal must walk through. For example, a footbath can include an elongated tub filled with an antibacterial solution and placed in a narrow walkway such that cattle are forced to walk through the footbath in order to get to their next location. In particular, a footbath can be sized such that each hoof of each of the cattle is fully immersed in the solution at least 2 or 3 times. The primary purpose of the footbath is to improve hoof hygiene and reduce the bacterial load of the hoof. Depending on cattle hygiene, antibacterial footbaths can be recommended anywhere between two to seven days a week. However, once the footbath solution has been used it is frequently released into a premise lagoon, which can lead to copper contamination in the ground water and soil on the farm. Since antibacterial footbaths can take place multiple times a week, such toxic release can occur on a regular basis. Furthermore, it is generally accepted that the footbath solution should be removed and replaced with a new solution after about 300 cattle have been treated. As such, depending on the size of the farm, footbath solution can be replaced several times a day, increasing the frequency of toxic release.

These toxic releases can have a significant negative effect on the surrounding area. In particular, copper sulfate is known to cause serious health issues in both humans and animals. Studies have shown that copper sulfate can have reproductive, teratogenic, mutagenic, and carcinogenic effects on both humans and other animals. Copper sulfate contamination can also be dangerous to microbial balance and crops grown in areas affected by the release of footbath solution. Studies have shown that copper sulfate can affect the bacterial population within the soil and cause defects in the shoots and roots of nearby crops. In particular, copper sulfate can be particularly dangerous in the environment due to the high water solubility of the chemical. For example, copper sulfate particles can be partly washed down to lower soil levels by water percolating through the ground, it can be wound to soil components, and partly changed into different metabolites or breakdown products.

Disclosed herein are systems and methods for removing elemental metals from metal containing waste, such as, but not limited to, agricultural wasted such as used agricultural antibacterial solutions.

By way of a non-limiting example, disclosed herein are systems and methods for removing copper from a copper sulfate antibacterial solution to produce harmless byproducts, and regenerating copper sulfate such that there is no need for disposal. In particular, disclosed herein is a system that can be coupled with a basin in order to extract copper or regenerate copper sulfate from used antibacterial solution. Furthermore, the methods described herein can be used to separate copper from a used antibacterial solution prior to disposal (i.e., discharged into the surrounding area), which can aid in the prevention of environmental bioaccumulation of the heavy metal. The systems and methods described herein can also be used to separate other elemental metals, such as zinc, from an antibacterial solution.

More particularly, systems and methods described herein can also be used to separate one or more non-ferrous metals from agriculture waste. In some embodiments the one or more non-ferrous metal(s) is selected from copper, zinc, nickel, tin, cadmium, gold, silver, and platinum from agriculture waste. In some embodiments, elemental zinc (Zn) is extracted from a zinc sulfate ($ZnSO_4$) solution or a zinc chloride ($ZnCl_2$) solution. In further embodiments, elemental copper (Cu) is extracted from a copper sulfate ($CuSO_4$) solution.

The method disclosed herein comprises first obtaining agricultural waste. Non-limiting examples of agricultural waste include used wash solutions and solutions contaminated with animal waste (such as urine or excrement). In some instances, the agricultural waste may be a used antibacterial solution. The agricultural waste may be collected after the solution is used to treat livestock. The livestock may include, but is not limited to, cattle, pigs, sheep, goats, horses, mules, asses, buffalo, camels, llamas, alpacas, and the like. The agricultural waste may be collected after a predetermined amount of livestock have been treated. As described in more detail herein, unexpectedly the extraction efficiency decreases after the solution has been used on/with a particular number of livestock, thus the agricultural waste is ideally monitored and collected at a time that would allow for better extraction efficiency.

The predetermined number of livestock may vary depending on the type of livestock and conditions of the surrounding environment. In some embodiments the predetermined number of livestock may be between 100 and 1000. In an embodiment the predetermined number of livestock is between 100 to 200, between 200 and 300, between 300 and 400, between 500 and 600, between 600 and 700, between 700 and 800, between 800 and 900, or between 900 and 1000. In a further embodiment the predetermined number of livestock is between 150 and 450. In another embodiment the predetermined number of livestock is 150.

The agricultural waste can be tested to determine the concentration of the metal of interest in the solution, which can then be used to determine the amount of elemental metal that can be extracted. The concentration of the metal in the solution can be from about 1% to about 10%. In an alternative example, the solution can have a concentration of from about 3% to about 10%. In yet another alternative example, the solution can have a concentration of from about 5% to about 10%. By way of a non-limiting example, a 300 liter basin containing an antibacterial solution can include from about 14.1 kg to about 28.2 kg of copper sulfate in order to achieve a target concentration of from about 5% to about 10%. The amount of metal available for extraction can be determined based on the chemical reaction that will occur. For example, the amount of copper available for extraction from an antibacterial solution containing copper sulfate can be determine based on: ($CuSO_4 + H_2O \rightarrow Cu + H_2SO_4 + O_2$). Since impurities can reduce the effectiveness of the extraction process, in at least one example, the agricultural waste (for example, a used antibacterial solution) can be filtered in order to remove debris.

An electrolysis reaction can be performed in order to extract elemental metal from the agricultural waste. The electrolysis reaction can be performed in a manner known in the art. The electrolysis reaction can include a cathode, an anode, and a power source to drive the reaction. As the reaction progresses, the elemental metal will build up on the cathode. Once the reaction is complete, the cathode can be removed and the elemental metal can be scraped and weight to determine extraction efficiency.

As described above, after the metal is extracted the electrolysis can produce byproducts. The byproducts can be collected and sold or reused. In the alternative, the remaining byproducts can be neutralized and turned into something usable.

As such, in accordance with the method disclosed herein, the agricultural waste can be processed to produce beneficial materials, rather than being dumped. For example, the elemental metal precipitate obtained from the electrolysis reaction can be recycled, used to regenerate a solution (for example, an antibacterial solution), or even sold for profit. The other byproducts of the reaction can also have beneficial uses, significantly reducing the amount of money lost on the dumped solution. The method described above can be used to remove elemental metal from agricultural waste of varying amounts from laboratory samples to large-scale industrial volumes. By way of a non-limiting example, as stated above, dairy farms can change out their antibacterial solution throughout the day based on the number of cattle owned. For example, a farm having 300 dairy cows can use about 300 liters of antibacterial solution. As such, the methods described herein can be used to remove metal from about 100 liters to about 300 liters of used antibacterial solution. In an alternative example, the methods herein can be used to remove metal from about 300 liters to about 1000 liters of used antibacterial solution. In another alternative example, the methods herein can be used to remove metal from over 2600 liters of used antibiotic solution.

In some embodiments, the methods described herein provide an efficiency of about 70% or greater. In further embodiments, the methods described herein provide an efficiency of about 80% or greater. In another embodiment, the methods described herein provide an efficiency of about 90% or greater. In another embodiment, the methods described herein provide an efficiency of about 95% or greater.

In some embodiments, the methods described herein provide an extracted metal sample having a purity of at least 80%, at least 85%, at least 90%, or at least 95%. In further embodiments, the methods described herein provide an extracted metal sample having about 90% purity or greater. In other embodiments, the methods described herein provide an extracted metal sample having about 95% purity or greater. In some embodiments, the methods described herein provide an extracted metal sample having about 99% purity.

The method disclosed herein can also be used to regenerate the metal containing components of the solution (for example, antibacterial solution) from the agricultural waste (for example, a used antibacterial solution). In this alternative method, no materials would need to be sold or repurchased for continued livestock health. The method for regenerating the antibacterial solution comprises collecting used antibacterial solution. The used antibacterial solution may be collected from the basin. An electrowinning reaction is performed on the used antibacterial solution. The electrowinning process can be performed using methods known in the art. Once the electrowinning reaction is complete, elemental metal and byproducts are produced. In lieu of removing the elemental metal, the metal can be scraped from the cathode and returned to the byproduct. In some embodiments, an additional agent (such as an oxidizing agent) can be introduced into the metal and byproduct, regenerating the antibacterial solution and producing water. The regenerated antibacterial solution is recycled back into the basin as fresh antibacterial solution.

The regeneration process can be repeated multiple times, removing the need to dispose of used basin fluid. In an embodiment, the regeneration process can be repeated 10 or more times with no difference in efficacy or bacteriostatic effects between the regenerated antibiotic solution and non-regenerated antibiotic solution. In some embodiments, the regeneration process can be repeated at least 10 times, at least 15 times, at least 20 times, at least 25 times, at least 30 times, at least 35 times, or at least 40 times with no difference in efficacy or bacteriostatic effects between the regenerated antibiotic solution and non-regenerated antibiotic solution.

By way of a non-limiting example, FIG. 1 illustrates an exemplary method 100 for extracting elemental copper (Cu) from a copper sulfate ($CuSO_4$) solution. In at least one example, the copper sulfate solution can be an antibacterial solution collected after the solution was used to treat cattle hooves (the used antibacterial solution being agricultural waste). For example, at block 110, the used antibacterial solution can be collected after a predetermined amount of cattle have been treated. As described in more detail herein, extraction efficiency decreases after too many cattle pass through the footbath, thus the antibacterial solution is ideally monitored and collected at a time that would allow for better extraction efficiency.

At block 120, the solution can be tested to determine the concentration of copper sulfate in the solution, which can then be used to determine the amount of elemental copper that can be extracted. The concentration of the solution can be from about 1% to about 10% copper sulfate. In an alternative example, the solution can have a concentration of from about 3% to about 10% copper sulfate. In yet another alternative example, the solution can have a concentration of from about 5% to about 10% copper sulfate. For example, a 300 liter footbath can include from about 14.1 kg to about 28.2 kg of copper sulfate in order to achieve a target concentration of from about 5% to about 10%. The amount of copper available for extraction can be determined based on the chemical reaction that will occur($CuSO_4+H_2O \rightarrow Cu+H_2SO_4+O_2$). Since impurities can reduce the effectiveness of the extraction process, in at least one example, the used antibacterial solution can be filtered in order to remove debris.

At block 130, an electrolysis reaction can be performed in order to extract elemental copper from the used antibacterial solution. The electrolysis reaction can be performed in a manner known in the art. The electrolysis reaction can include a cathode, an anode, and a power source to drive the reaction. In at least one example, the electrolysis reaction described herein can be written as $CuSO_4+H_2O \rightarrow Cu+H_2SO_4+O_2$, producing copper (Cu), sulfuric acid ($H_2SO_4$), and oxygen ($O_2$). As the reaction progresses, the elemental copper will build up on the cathode. Once the reaction is complete, at block 140, the cathode can be removed and the elemental copper can be scraped and weight to determine extraction efficiency.

As described above, after the copper is extracted the electrolysis can produce sulfuric acid as a byproduct. The sulfuric acid can be collected and sold or reused as a pure acid. In the alternative, at block 150, the remaining sulfuric acid can be neutralized and turned into something usable. In at least one example, the sulfuric acid can be neutralized by titration with an appropriate base. In one example, the base is sodium hydroxide (NaOH), producing sodium sulfate and water ($H_2SO_4+2NaOH \rightarrow Na_2SO_4+2H_2O$). In an alternative example, the sulfuric acid can be neutralized using limestone, or calcium carbonate ($CaCO_3$), to produce calcium sulfate ($CaSO_4$), also referred to as gypsum ($CaCO_3+H_2SO_4 \rightarrow CaSO_4+CO_2+H_2O$). The gypsum can then be used for various purposes including, in at least one example, as a fertilizer on the farm land. In an alternative example, the gypsum, can be sold to developers as a building material.

As such, in accordance with method 100 the copper sulfate ($CuSO_4$) solution can be processed to produce beneficial materials, rather than being dumped. For example, the elemental copper (Cu) precipitate obtained from the electrolysis reaction can be recycled, used to regenerate copper sulfate, or even sold for profit. The other byproducts of the reaction can also have beneficial uses, significantly reducing the amount of money lost on the dumped solution. The method described above can be used to remove copper from copper sulfate solutions of varying amounts from laboratory samples to large-scale industrial volumes. For example, as stated above dairy farms can change out their antibacterial solution throughout the day based on the number of cattle owned. For example, a farm having 300 dairy cows can use about 300 liters of antibacterial solution. As such, the methods described herein can be used to remove copper from about 100 liters to about 300 liters of copper sulfate solution. In an alternative example, the methods herein can be used to remove copper from about 300 liters to about 1000 liters of copper sulfate solution. In another alternative example, the methods herein can be used to remove copper from over 2600 liters of copper sulfate solution.

In at least one example, the methods described herein have been tested in various scales providing an efficiency of about 90% or greater. In an alternative example, the copper extraction methods described herein have been shown to allow for an efficiency of about 95% or greater.

As stated above, the copper extracted using the method described in FIG. 1 can then be collected and sold for profit. Depending on the size of the dairy farm and the health of the cattle, large amounts of antibacterial solution can be used every day. For example, if a dairy farm extracts about 50 pounds of pure, copper every day, the farm could produce about 18,250 pounds of copper in a year. The market price for copper, like any metal, fluctuates, however depending on the market price a dairy farm as described could extract nearly $50,000 USD worth of copper every year by implementing the methods disclosed herein.

While the amount of copper is valuable, the purity may also be determined. The methods described herein have provided an extracted copper sample having about 99% purity. Copper having this high of purity can be extremely valuable in the market. It was believed that a correlation existed between extraction efficiency and the number of cattle that had walked through the antibacterial solution. After a series of experiments were performed, as described in detail below, it was determined that the best extraction efficiency could be achieved after about 100 to about 200 cattle could passed through the antibacterial solution.

Figure 2:
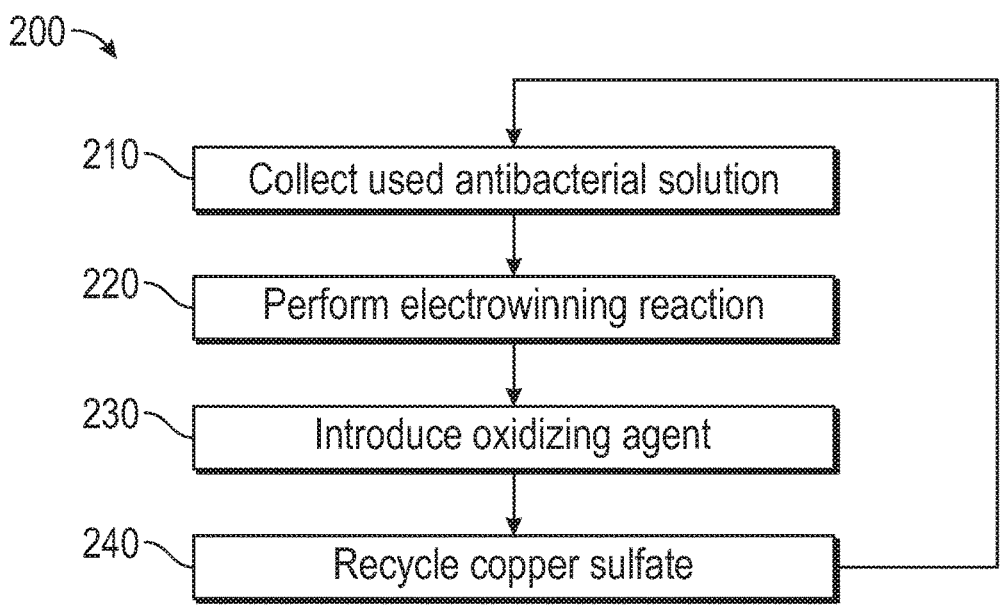
FIG. 2 illustrates an exemplary method for regenerating copper sulfate from a used antibacterial solution.

While method 100 describes a way to extract and resell copper, the method disclosed herein can also be used to regenerate copper sulfate from the used antibacterial solution. In this alternative method, no materials would need to be sold or repurchased for continued cattle health. A method 200 for regenerating copper sulfate is illustrated in FIG. 2. At block 210, used antibacterial solution containing copper sulfate is collected from a footbath. At block 220, an electrowinning reaction is performed on the used antibacterial solution. The electrowinning process can be performed using methods known in the art. Once the electrowinning reaction is complete, elemental copper and sulfuric acid are produced. In lieu of removing the elemental copper, the copper can be scraped from the cathode and returned to the sulfuric acid. At block 230, a strong oxidizing agent can be introduced into the copper and sulfuric acid, regenerating copper sulfate and producing water. In at least one example, the strong oxidizing agent is hydrogen peroxide ($H_2O_2$). The reaction with hydrogen peroxide generates copper sulfate and water in accordance with the following chemical reaction $Cu+H_2SO_4+H_2O_2 \rightarrow CuSO_4+H_2O$. At block 240, the regenerated copper sulfate solution is recycled back into the footbath as fresh antibacterial solution.

The regeneration process can be repeated multiple times, removing the need to dispose of used footbath fluid. Several experiments were performed testing the efficacy and bacteriostatic effects of the regenerated copper sulfate, as detailed below. The experiments showed no difference in efficacy or bacteriostatic effects between the regenerated copper sulfate and the conventional copper sulfate with respect to the tested bacteria.

It will be appreciated by those of skill that the basic principles of the above example involving extracting elemental copper (Cu) from a copper sulfate ($CuSO_4$) solution (used antibacterial solution), can be appropriately applied to extract elemental metal from other types of agricultural waste.

Also disclosed herein, is a system compatible with the disclosed extraction and regeneration methods. The system for extracting elemental metals from a solution can include at least a basin coupled with one or more filtration tanks, an electrolysis chamber, and a storage tank. The system may also be coupled with one or more power supplies suitable to operate the electrolysis chamber, pumps, and/or other components. In at least one embodiment, the system can include a computing device configured to control the pumps, tanks, sensors, and overall system. In some embodiments, the system disclosed herein can be placed on a trailer such that it is mobile. In an alternative embodiment, the system can be stationary, or built into a stationary facility.

In at least one embodiment the basin can have a volume of about 1 to about 1000 liters. In some embodiments the basin can have a volume of about 100 to about 1000 liters. The basin can be made of any material suitable for containing antibacterial liquid. The basin may also be made of any material suitable for supporting the weight of any animal(s) that will be entering the basin. In one embodiment, the basin may include a stainless steel sheet. In other embodiments the basin may include an anti-slip material to prevent the livestock from slipping and/or sliding in the basin. In some embodiments the basin may further comprise splash guards on either side of the footbath to prevent loss of fluid as livestock pass through. The splash guards can also prevent accidental spillage of the copper sulfate into the surrounding area. The basin may also comprise a plurality of nozzles. In at least one embodiment, the basin can include at least one nozzle on each side of the basin. In an alternative embodiment, the basin can include nozzles on only two walls. One or more of the nozzles can be coupled with a water source such that they can be used to rinse the basin. In another embodiment, one or more of the nozzles may be coupled with at least one tank. In some instances, one or more of the tanks may contain water or antibacterial solution. The basin can also include an anti-slip flooring material to prevent the livestock from sliding as they pass through the basin. In at least one embodiment the anti-slip flooring material can be a rubber mat. In another embodiment the anti-slip flooring material may be a polymer that adheres to the material of the basin.

In some embodiments the basin may include a gradual slope. The gradual slope can be at an angle such that the livestock receive better immersion as they walk through the basin. Additionally, the gradual slope can be configured in order to provide better drainage of the used antibacterial solution. The basin can also include a valve for draining fluid from the basin. The basin can further include an infrared sensor. The infrared sensor can be used to track the number of livestock that have passed through the basin. In some instances the infrared sensor may be coupled with a pump. In further instances, when the infrared sensor determines a predetermined number has been reached it can activate the pump to drain the fluid from the basin. In some embodiments the predetermined number of livestock may be between 100 and 1000. In one embodiment the predetermined number of livestock is between 100 to 200, between 200 and 300, between 300 and 400, between 500 and 600, between 600 and 700, between 700 and 800, between 800 and 900, or between 900 and 1000. In a further embodiment the predetermined number of livestock is between 150 and 450. In another embodiment the predetermined number of livestock is 150.

The system can further include one or more filtration tanks coupled with the basin. The filtration tanks can be sized to accept the amount of antibacterial fluid contained in the basin. The filtration tanks can further include one or more mesh baskets configured to capture debris as the fluid enters the filtration tank. In at least one embodiment, the one or more mesh filter baskets can include mesh of varying sizes. In an alternative embodiment, any filtration apparatus suitable for removing debris can be used within the filtration tanks. In one embodiment, the mesh or filtration apparatus can be used that is capable of filtering large debris. The filtration tanks can be coupled with the electrolysis chamber such that the filtered fluid can be pumped from the filtration tanks into an electrolysis chamber.

Figure 5:
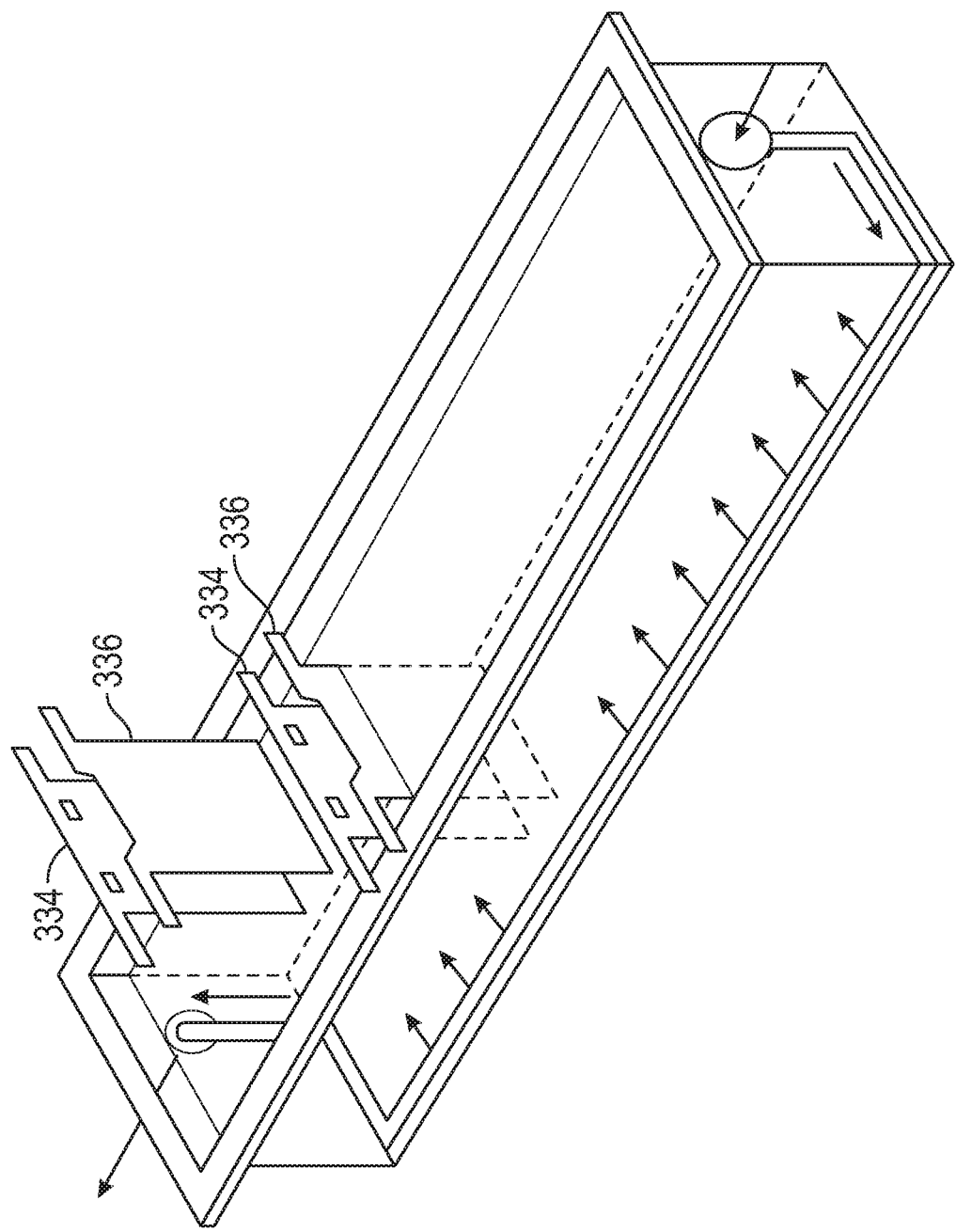
FIG. 5 illustrates an exemplary electrowinning cell compatible with the system disclosed herein.

The electrolysis chamber can include one or more cathodes, one or more anodes, and a power supply to drive the reaction. In at least one embodiment, the electrolysis chamber can include an electrowinning cell. By way of background, an exemplary electrowinning cell is shown in FIG. 5 (see, e.g., M. Schlesinger, et al., Extraction Metallurgy of Copper (2011)). The electrowinning cell can include one or more cathodes and one or more anodes. As will be appreciated by those of skill, the one or more cathodes include the appropriate cathode to extract the elemental metal of interest. By way of a non-limiting example, a copper cathode may be used to extract elemental copper from a copper sulfate solution. By way of another example, a zinc cathode maybe used to extract elemental zinc from a zinc sulfate solution.

The system described herein can be coupled with any power supply suitable to operate the electrolysis chamber, pumps, and/or other components. In at least one example, the power supply is a digital DC power supply. In an alternative example, the power supply is one or more solar panels.

In one embodiment, the electrolysis chamber may further include one or more sensors to track the reaction. The one or more sensors can include, but are not limited to, a temperature sensor, a pH sensor, and/or a sensor that can measure the concentration of the metal of interest. In a further embodiment, the electrolysis chamber can further be coupled with a storage tank, such that once the electrolysis reaction is complete one or more substances can be transported to the storage tank. The storage tank may also further include one or more sensors, such as a temperature sensor, a pH sensor, and/or a sensor that can measure the concentration of the metal of interest.

Figure 3:
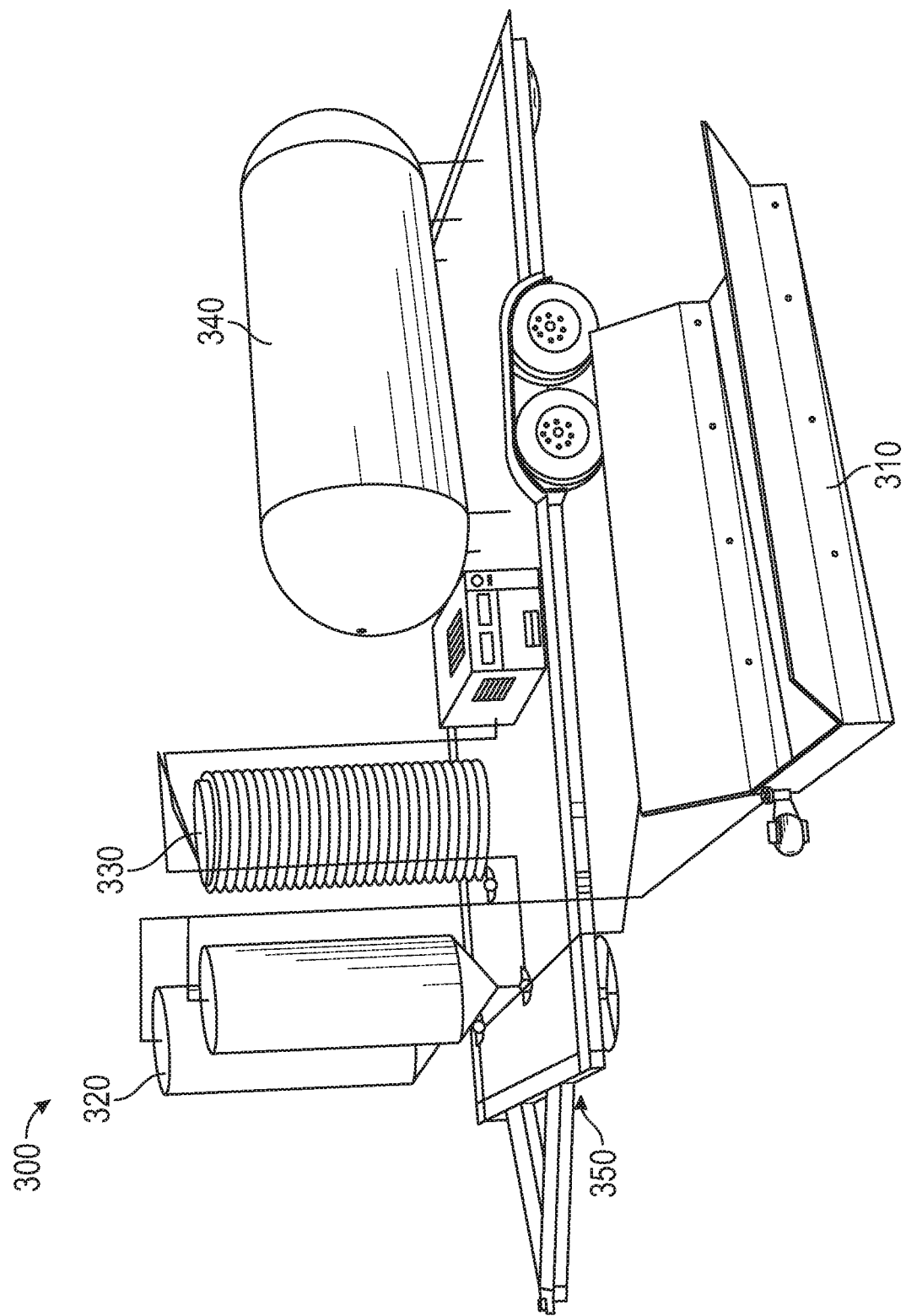
FIG. 3 illustrates an exemplary system compatible with the extraction and regeneration methods disclosed herein.

An exemplary system 300 compatible with the extraction and regeneration methods disclosed herein is illustrated in FIG. 3. The system 300 for extracting copper can include at least a footbath 310 (i.e., basin) coupled with one or more filtration tanks 320, an electrolysis chamber 330, and a storage tank 340. In at least one embodiment, the system 300 can include a computing device (not shown) configured to control the pumps, tanks, sensors, and overall system. The system 300 disclosed herein can be placed on a trailer 350 such that it is mobile. In an alternative embodiment, the system 300 can be stationary, or built into a stationary facility.

Figure 4A:
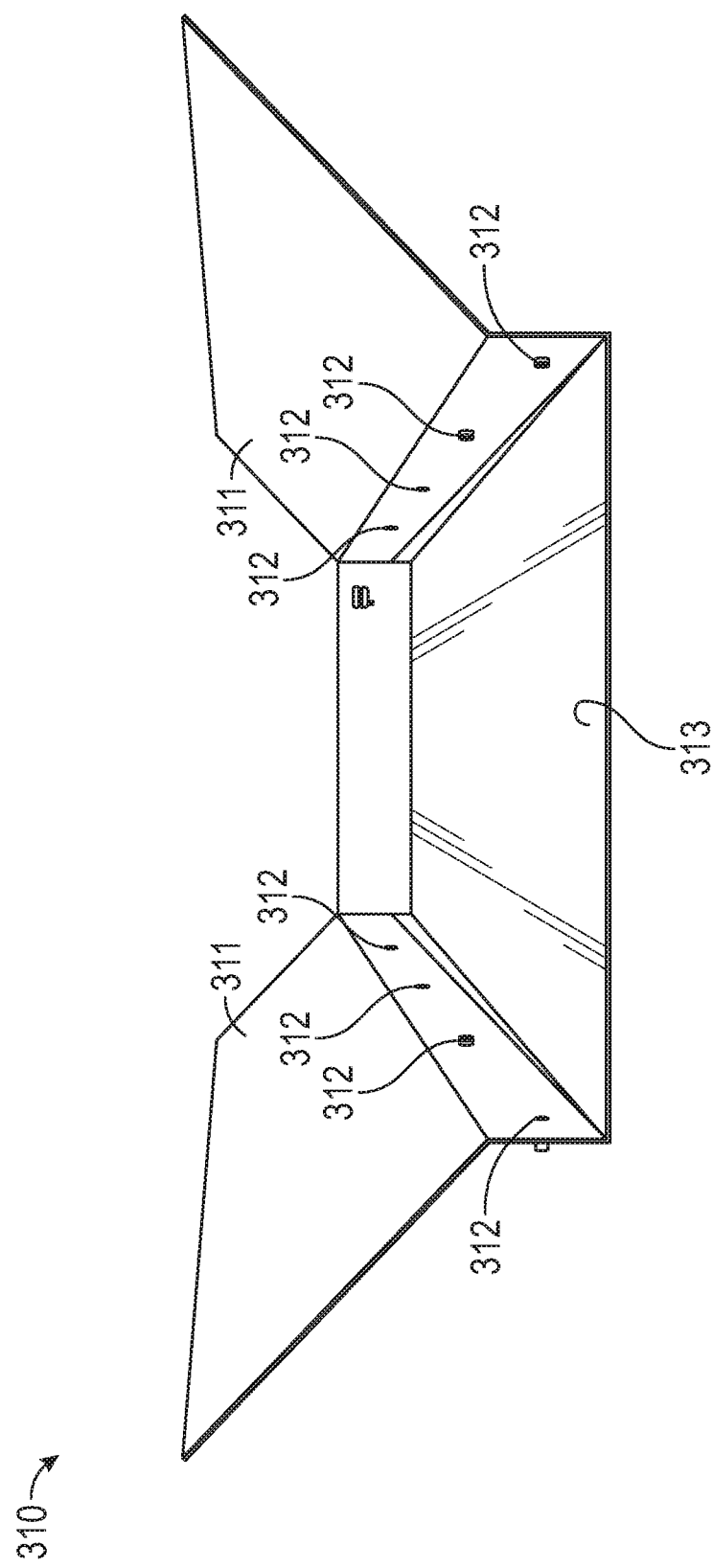

In one embodiment the basin is a footbath 310 can be about 2.5 meters in length, about 0.9 meters wide, and about 0.15 deep and can have a volume of about 340 liters. In an alternative example, the footbath 310 can be about 3.7 meters in length, about 0.6 meters wide, and about 0.28 meters deep. The footbath 310 can be made of any material suitable for containing antibacterial liquid and supporting cattle. In at least one example, the footbath 310 can include a stainless steel sheet having a thickness of about 3 mm. A footbath 310 compatible with system 300 is shown in detail in FIGS. 4A-4C. As shown in FIG. 4A, the footbath 310 can include splash guards 311 on either side of the footbath to prevent loss of fluid as cattle pass through. The splash guards can also prevent accidental spillage of the copper sulfate into the surrounding area. In at least one example the splash guards 311 can be made of stainless steel. The footbath 310 can further include a plurality of nozzles 312. In at least one embodiment, the footbath 310 can include at least one nozzle 312 on each side of the footbath 310. In an alternative embodiment, the footbath 310 can include nozzles 312 on only two walls. The plurality of nozzles 312 can be coupled with a water source such that they can be used to rinse the footbath 310. The footbath 310 can also include an anti-slip flooring material 131 to prevent the cattle from sliding as they pass through the footbath 310. In at least one embodiment the anti-slip flooring material 313 can be a rubber mat.

Figure 4B:
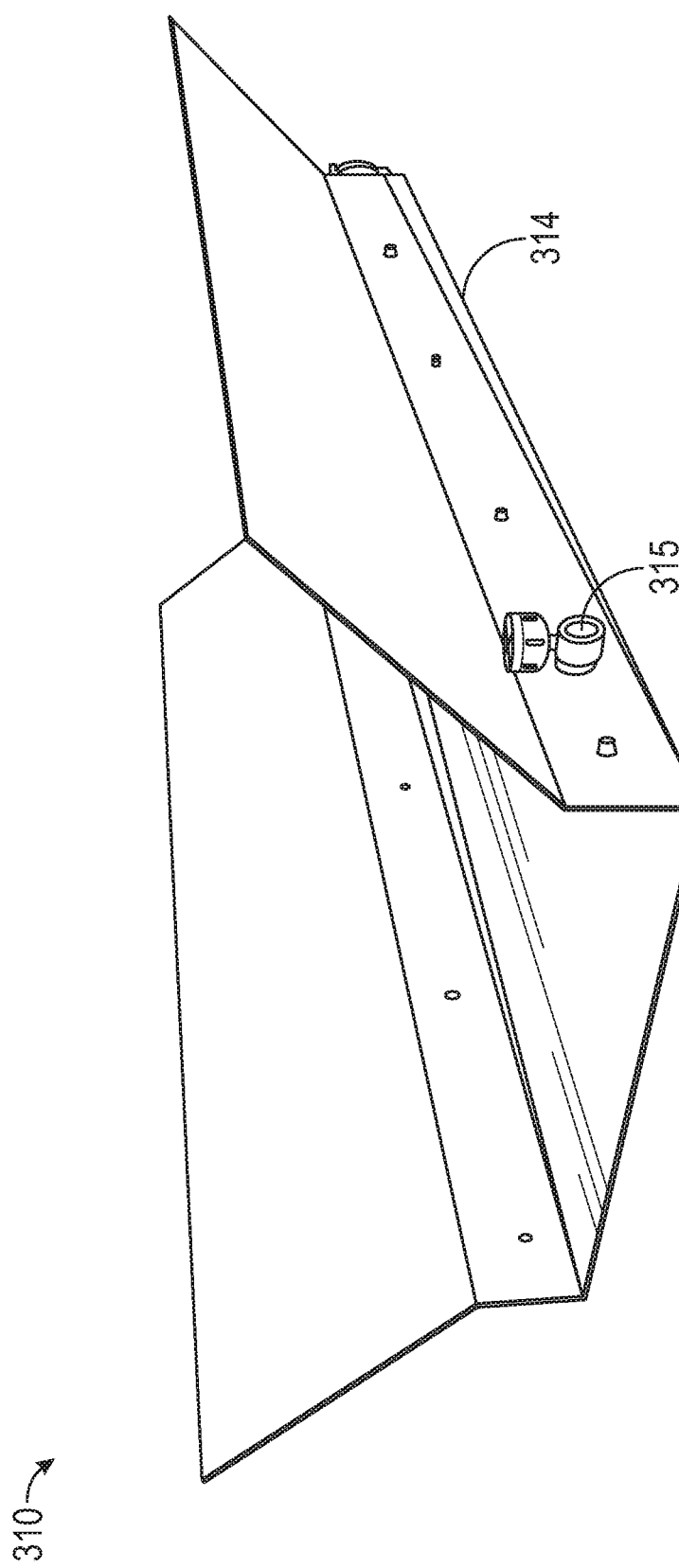

FIG. 4B shows a side view of the footbath 310. As shown, the footbath can include a gradual slope 314. The gradual slope 314 can be at an angle such that the cattle receive better hoof immersion as they walk through the footbath 310. Additionally, the gradual slope 314 can be configured in order to provide better drainage of the used antibacterial solution. The footbath 310 can also include a valve 315 for draining fluid from the footbath 310. FIG. 4C shows a back view of the footbath 310. As shown, the footbath 310 can further include an infrared sensor 316 coupled with a pump. The infrared sensor 316 can be used to track the number of cattle that have passed through the footbath 310, when the infrared sensor 316 determines a predetermined number has been reached it can activate the pump to drain the fluid from the footbath 310.

Referring back to FIG. 3, the system 300 can further include one or more filtration tanks 320 coupled with the footbath 310. The filtration tanks 320 can be sized to accept the amount of antibacterial fluid contained in the footbath 310. In at least one example, the filtration tanks 320 can be capable of holding about 400 liters of liquid. The filtration tanks 320 can further include one or more mesh baskets configured to capture debris as the fluid enters the filtration tank 320. In at least one embodiment, the one or more mesh filter baskets can include mesh of varying sizes. In an alternative embodiment, any filtration apparatus suitable for removing large debris can be used within the filtration tanks 320. The filtration tanks 320 can be coupled with the electrolysis chamber 330 such that the filtered fluid can be pumped from the filtration tanks 320 into an electrolysis chamber 330.

The electrolysis chamber 330 can include one or more cathodes, one or more anodes, and a power supply to drive the reaction. In at least one embodiment, the electrolysis chamber 330 can include an electrowinning cell 332. The electrowinning cell 332 can include one or more cathodes 334 and one or more anodes 336. The one or more cathodes can include a copper cathode to extract elemental copper from the copper sulfate solution. The system 300 described herein can be coupled with any power supply suitable to operate the electrolysis chamber 330. In at least one example, the power supply is a digital DC power supply. In an alternative example, the power supply is one or more solar panels. The electrolysis chamber 300 can further include one or more sensors to track the reaction. The one or more sensors can include, but are not limited to, a temperature sensor, a pH sensor, and/or a sensor that can measure the concentration of copper. The electrolysis chamber 330 can further be coupled with a storage tank 340, such that once the electrolysis reaction is complete one or more substances can be transported to the storage tank 340. The storage tank 340 may also further include one or more sensors, such as a temperature sensor, a pH sensor, and/or a sensor that can measure the concentration of copper.

As discussed above, the system described herein can be used to implement the methods disclosed herein. For example, the basin may be filled with an antibacterial solution. The basin can then be used to treat livestock. The number of livestock passing through the basin 310 is monitored by the infrared sensor. Once a predetermined number of livestock usage is reached, the infrared sensor can send a signal to a computing device (not shown) that triggers a pump coupled with the basin and the used antibacterial solution is drained from the basin through one or more valves. The used antibacterial solution is pumped into the one or more filtration tanks and filtered to remove debris.

If the goal is to collect the elemental metal, once the electrolysis is complete, the elemental metal can be removed by removing the cathode from the electrolysis chamber.

The byproducts from the electrolysis reaction can be pumped into a storage tank. At this point, the byproducts can be used in this form, or the byproduct can be further processed. In some embodiments the byproduct can be neutralized. The neutralizing agent can be slowly added to the storage tank until the pH of the solution reaches the desired level. In at least one embodiment, the neutralizing agent can be a base. In some embodiments the base can be sodium hydroxide, as described above. In an alternative embodiment, the base can be calcium carbonate producing calcium sulfate and water. In at least one embodiment, the calcium sulfate produced can be collected and used as a fertilizer, the resulting water can then be released into the environment. In an alternative example, the system can be coupled with an irrigation system and the water can be pumped directly into the irrigation system.

Alternatively, the antibacterial solution can be regenerated. After the electrolysis reaction is completed, the elemental metal covered cathode can be scraped by any means in order to remove the extracted metal from the cathode. The metal is placed back into the electrolysis chamber with the byproduct and additional agents as needed (e.g., oxidizing agents) can be added. In some embodiments the additional agent is added to the electrolysis chamber via a pump. In at least one example, the additional agents can be stored in a storage tank coupled with the electrolysis chamber. The reaction between the additional agent, elemental metal, and byproduct regenerates the antibacterial solution, as described in detail above. In some embodiments, the regenerated antibacterial solution is then pumped into the storage tank until the solution is needed. In another embodiment, the regenerated antibacterial solution may be directly pumped back into the basin.

In another embodiment the regeneration of the antibacterial solution occurs in the storage tank. For example, after the electrolysis reaction is completed, the elemental metal is placed into the storage tank with the byproduct and an additional agent (e.g., oxidizing agent) can be added. In some embodiments the additional agent is added to the storage tank via a pump. In at least one example, the additional agent can be stored in a storage tank coupled with the storage tank. In some embodiments the regenerated antibacterial solution is then retained the storage tank until the solution is needed. In another embodiment, the regenerated antibacterial solution may be directly pumped back into the basin.

In at least one embodiment, after the used antibacterial solution is pumped from the basin, a pump coupled with the plurality of nozzles can be activated to rinse the basin for a predetermined period of time. In at least one example, the pump can be programmed to wash the basin for a period of about 30 to about 60 seconds. The water used to wash the basin can be obtained from one or more sources. In some embodiments the water used to wash the basin can be collected and treated to remove debris and/or contaminants.

The regeneration process is an exothermic reaction and can thus generate a large amount of heat. In at least one embodiment a cooling water jacket can be added to surround the electrolysis chamber, allowing the heat to transfer to the water jacket, creating hot water. The water jacket can be coupled with the nozzles such that the hot water created from the exothermic reaction can be used to rinse the basin. In an alternative example, the water used to flush the basin can be obtained from an outside source.

After the basin is rinsed, in some embodiments, the regenerated copper sulfate may be recycled back into the basin for further use.

Figure 6:
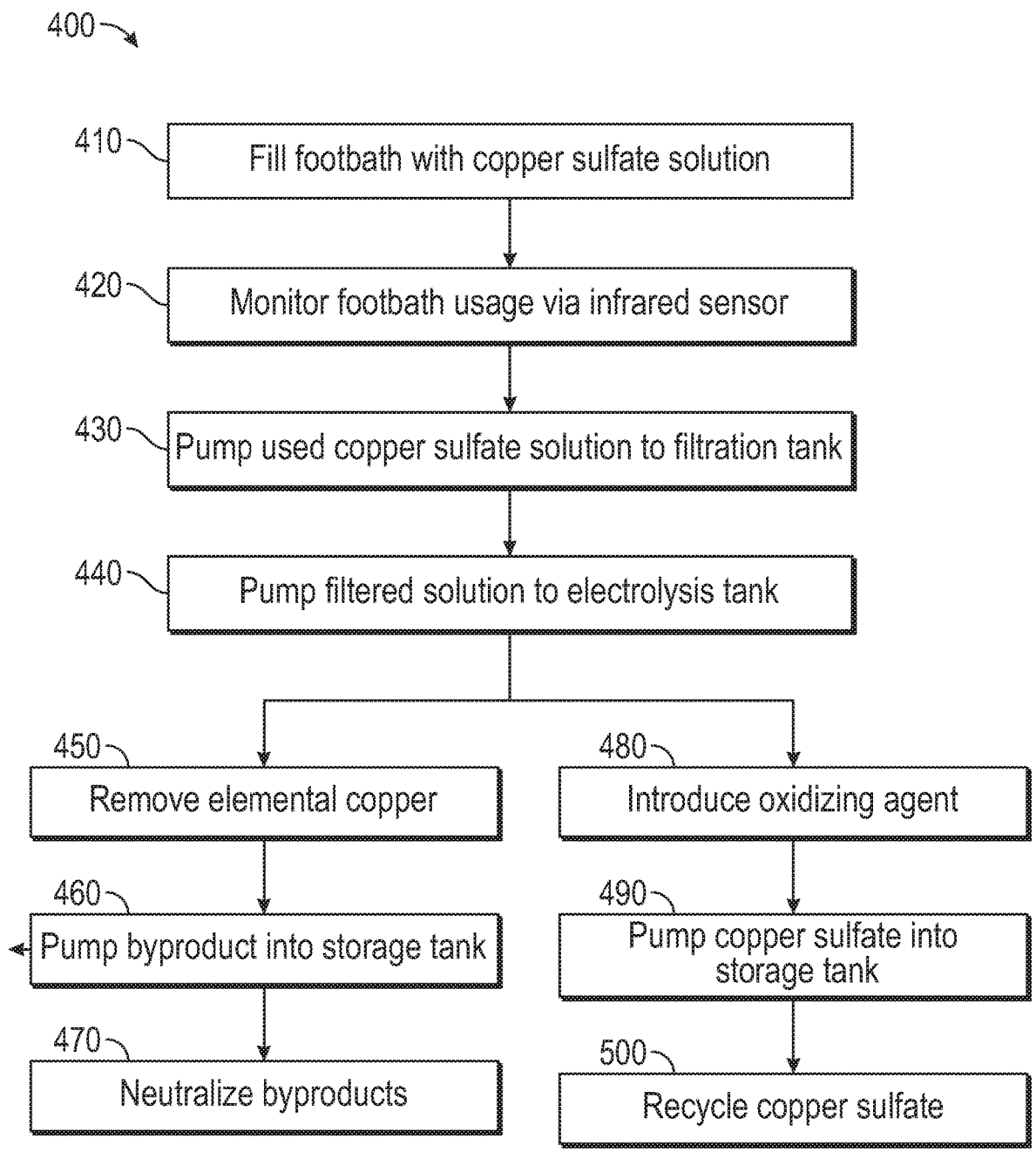
FIG. 6 illustrates an exemplary method for using one or more of the systems disclosed herein.

The system shown in FIGS. 3-5 can be used to implement method 400, as shown in FIG. 6. Method 400 can begin at block 410, where footbath 310 is filled with a copper sulfate solution. The footbath 310 can then be used to treat cattle by having the cattle walk through the footbath. At block 420, the number of cattle passing through the footbath 310 is monitored by the infrared sensor 316. Once a predetermined number of cattle is reached, the infrared sensor 316 can send a signal to a computing device (not shown) that triggers the method 400 to progress to block 430. At block 430, a pump coupled with the footbath 310 is triggered and the used copper sulfate solution is drained from the footbath 310 through valve 315. At block 440, the used copper sulfate solution is pumped into the one or more filtration tanks 320 and filtered to remove large debris.

If the goal is to collect the elemental copper, the method proceeds to block 450. At block 450, elemental copper is removed from the copper sulfate via an electrolysis reaction within the electrolysis chamber 330. Once the electrolysis is complete, the elemental copper can be removed by removing the cathode from the electrolysis chamber 300.

At block 460, the sulfuric acid produced during the electrolysis reaction is pumped into a storage tank 340. At this point, the sulfuric acid can be used in this form, or the process can continue to neutralization. If a different byproduct is desired, the process can continue to block 470. At block 470, the sulfuric acid can be neutralized using a base. The base can be slowly added to the storage tank until the pH of the solution reaches the desired level. In at least one embodiment, the base can be sodium hydroxide, as described above. In an alternative embodiment, the base can be calcium carbonate producing calcium sulfate and water. In at least one embodiment, the calcium sulfate produced can be collected and used as a fertilizer, the resulting water can then be released into the environment. In an alternative example, the system 300 can be coupled with an irrigation system and the water can be pumped directly into the irrigation system. If the methods and systems described herein were implemented in dairy farms, the heavy metal contamination in the surrounding areas could be significantly decreased.

On the contrary, if the goal is to regenerate copper sulfate, the method proceeds from block 440 to block 480. After the electrolysis reaction is completed at block 440, the copper covered cathode can be scraped by any means in order to remove the extracted copper from the cathode. The copper is placed back into the electrolysis chamber 330 with the sulfuric acid and at block 480 an oxidizing agent can be added via a pump. In at least one example, the oxidizing agent can be stored in a small storage tank coupled with the electrolysis chamber 330. As described in detail above, the oxidizing agent can be, for example, hydrogen peroxide. The reaction between the oxidizing agent, copper, and sulfuric acid regenerates copper sulfate, as described in detail above. At block 490 the copper sulfate solution is then pumped into the storage tank 340 until the solution is needed.

In another embodiment, if the goal is to regenerate copper sulfate, after the electrolysis reaction is completed at block 440, the copper covered cathode can be scraped by any means in order to remove the extracted copper from the cathode. The copper is placed into the storage tank 340 with the sulfuric acid and at block 480 an oxidizing agent can be added via a pump. In at least one example, the oxidizing agent can be stored in a small storage tank coupled with the storage tank 340. As described in detail above, the oxidizing agent can be, for example, hydrogen peroxide. The reaction between the oxidizing agent, copper, and sulfuric acid regenerates copper sulfate, as described in detail above. The copper sulfate solution is then retained the storage tank 340 until the solution is needed.

In at least one embodiment, after the used antibacterial solution is pumped from the footbath, a pump coupled with the plurality of nozzles can be activated to rinse the footbath 310 for a predetermined period of time. In at least one example, the second pump can be programmed to wash the footbath for a period of about 30 to about 60 seconds. The water used to wash the footbath can be obtained from one or more sources.

The regeneration process is an exothermic reaction and can thus generate a large amount of heat. In at least one embodiment a cooling water jacket can be added to surround the electrolysis chamber 330, allowing the heat to transfer to the water jacket, creating hot water. The water jacket can be coupled with the nozzles such that the hot water created from the exothermic reaction can be used to rinse the footbath. In an alternative example, the water used to flush the footbath can be obtained from an outside source.

After the footbath 310 is rinsed, the method 400 proceeds to block 500, and the regenerated copper sulfate is recycled back into the footbath 310 for further use. The regeneration methods and systems described herein can reduce copper sulfate usage by up to 75% by allowing farmers to regenerate the copper sulfate they have already used.

As previously mentioned, the systems and methods described above can be used to remove elemental metals from other solutions with the use of the appropriate cathode. By way of non-limiting examples, this method can be used to extract elemental zinc (Zn) from zinc sulfate ($ZnSO_4$) antibacterial solutions and zinc chloride ($ZnCl_2$) antibacterial solutions. The methods described herein have been tested with both zinc sulfate ($ZnSO_4$) antibacterial solutions and zinc chloride ($ZnCl_2$) antibacterial solutions.

The following example is provided to illustrate the subject matter of the present disclosure. The experiments described below were conducted as a proof of concept to determine the feasibility of copper extraction from copper sulfate as used in antibacterial footbaths. The example is not intended to limit the scope of the present disclosure and should not be so interpreted.

EXAMPLES

Example 1

A small scale experiment was performed to compare the extraction efficiency of copper (Cu) obtained from the electrolysis of a laboratory copper sulfate ($CuSO_4$) sample to the amount of copper obtained from the electrolysis of a combination of copper sulfate ($CuSO_4$) antibacterial solutions obtained from various dairy farms.

The laboratory copper sulfate ($CuSO_4$) solution was designed to mimic the concentration of a fresh antibacterial bath solution. In general, it has been shown that a 340 liter bath requires 16.78 kg of copper sulfate, as indicated in a study performed at the University of Wisconsin, Madison, School of Veterinary Medicine. Using the ratio set out, 12.5 g of copper sulfate pentahydrate ($CuSO_4 \cdot 5H_2O$) in 250 mL of water having a $CuSO_4 \cdot 5H_2O$ ratio of 1:1. Based on a molar calculation, the elemental copper concentration is 0.198 mol/L of the solution. During the experiment the pH of the solution was measured before and after electrolysis. Additionally, samples were taken (1 mL) at various points throughout the duration of the experiment for copper analysis to determine the efficiency of copper removal from the solution, as shown in Table 1.

TABLE 1

| Sample | Time |
| --- | --- |
| 1 | 31 minutes, 45 seconds |
| 2 | 1 hour, 3 minutes, 30 seconds |
| 3 | 1 hour, 35 minutes, 15 seconds |
| 4 | 2 hours, 7 minutes, 12 seconds |

A second laboratory copper sulfate solution was made and run through electrolysis simultaneously, in order to compare data. Samples were taken from the second solution continuously and compared to the first solution in order to determine linearity and extraction efficiency.

In the present experiment, the electrolysis was performed using a variable linear DC power supply (for example, a Tekpower TP3005T Variable Linear DC Power Supply, 0-30 Volts at 0-5 Amperes) including two electrodes a platinum coating titanium electrode and a copper electrode. The platinum coated titanium electrode was connected to a positive power connection while the copper electrode is on the negative power connection. In the present experiment, the electrodes do not interfere with the reactions which occur at the surface of each electrode, but merely act as a point of connection between the electrical circuit and the solution. The standard reduction potential can be used to determine which of the ions will be deposited at the cathode and the anode respectively; the reduction potential for each ion is shown in Table 2, below.

TABLE 2

| Ion | Reduction Potential (V) |
| --- | --- |
| Copper ($Cu^{2+}$) | 0.340 |
| Hydrogen ($H^+$) | 0 |
| Sulfate ($SO_4^{2-}$) | −0.94 |
| Hydroxide ($OH^-$) | 1.23 |

The electrolysis time required to produce a known quantity of a particular substance can be determined by determining the quantity of substance produced or consumed in moles. As stated above, the molar concentration of elemental copper in the first sample of the present experiment is 0.198 mol/L. The balanced half equation for determining the duration of electrolysis can be written as $Cu \rightarrow Cu^{2+} + 2e^-$, the number of moles of electrons required can be determined by multiplying the number of electrons with the molar concentration of copper (for example, 2×0.198=0.396). As such, 0.396 moles of electrons are required in order to withdraw 0.198 moles of copper from the copper sulfate solution. The moles of electrons are then converted to coulombs using Faraday's constant (1 Faraday=96,485 coulombs) (96485× 0.396=38208.06). Once the value in coulombs is obtained, it can be used to calculate the time required by dividing the number of coulombs by the amperes provided (i.e., ((Amperes)×(time)=coulombs); therefore ((time)=38208.06 coulombs/5 Amperes)). As such, the time required to separate out 0.198 moles of copper from the copper sulfate solution using electrolysis is 7641.61 seconds, or about 2.12 hours. Once the electrolysis was complete, the anode and cathode were removed and the amount of copper extracted from the solution was determined.

In the present experiment, a copper extraction efficiency of 75.2% was achieved in the sample obtained from the dairy farm. It was determined that the power source used in the above described experiment was faulty. The process was repeated using a functioning power source and an extraction efficiency of greater than 95% was achieved in the sample obtained from the dairy farm.

Example 2

An experiment was performed to determine whether the sulfuric acid from the electrolysis reaction could be reacted in order to produce a beneficial product after neutralization.

A 0.2 molar (mol/L) copper sulfate solution was used, having 3.12 g of elemental copper in 250 mL of solution. A platinum coated titanium electrode and a copper electrode were attached to a power supply (such as a DC power supply) capable of producing 10 ampere and 20 volts. Prior to electrolysis, the pH of the solution was measured and determined to be 3.6. Electrolysis was performed for two hours in order to extract the elemental copper from the solution. Following the electrolysis, the electrodes were weighed to determine the amount of copper extracted from the solution. The electrolysis reaction produced 2.94 g of copper, resulting in an extraction efficiency of 94.2%.

After the copper was extracted, the pH of the remaining solution was measured and was determined to be 0.7. About 5 g of calcium carbonate ($CaCO_3$) was then added to the remaining solution in order to achieve a desired ending pH of 6.5. As the calcium carbonate is added to the remaining solution a reaction occurs producing calcium sulfate ($CaCO_3 + H_2SO_4 \rightarrow CaSO_4 + CO_2 + H_2O$), or gypsum which can then be used as fertilizer.

Example 3

An experiment was performed in order to determine efficiency of copper extraction on materials that had been used to treat a large number of cattle. The experiment additionally evaluated the cost benefits that the methods disclosed herein.

Multiple samples of copper sulfate footbath solution was collected from a commercial dairy farm prior to use and after bring used to prevent bacterial growth on hooves. The samples collected after being used as an antibacterial were filtered in order to remove large particles from the solution. An electrolysis reaction was performed, as described in Example 2, above, on both the unused and used samples of footbath solution.

After electrolysis, the copper electrode was weighed to determine the extraction efficiency of the electrolysis. Based on the amount of copper sulfate in the original solution, the extraction efficiency was determined to be about 90%. Some variation in the efficiency was experienced due to potential contamination in the samples collected from the dairy farm (for example, manure, urine, soil, etc.). As described above, the remaining solution was treated with calcium carbonate to produce gypsum, a fertilizer that could then be used on the agricultural land.

Based on the extraction efficiency of the present Example, the potential value of the copper extracted from a commercial farm's footbath solution was determined. Specifically, the average amount of copper capable of being extracted in a liter of footbath solution is about 12 g. While the price of copper fluctuates, at the time of the present Example the price was $5,000 USD/ton of copper. On average, a dairy farm requires roughly 1 liter of copper sulfate antibacterial solution per cow, as such a 300 cow dairy farm would require 300 liters of solution for each disinfectant session. Using this data, about 3.6 kg of copper can be used per treatment session (e.g., 300 liters, 12 grams per liter).

Many dairy farms change their antibacterial solution multiple times a day. In the present Example, it is assumed that a dairy farm having 300 cattle would change their footbath solution three times a day, therefore having a potential for producing 10.8 kg of copper every day. Considering the 90% efficiency achieved in the present Example, an extraction method as described herein could collect about 9.72 kg of copper from a single day's footbath solution. If a dairy farm performed disinfectant sessions daily, about 3547.8 kg of copper could be extracted from footbath solution every year. If the copper was collected and sold the farm could earn over $17,000 every year for merely recycling byproducts of fluids they typically released into a premise lagoon. Furthermore, if the farm converts the sulfuric acid to gypsum, they can produce a viable fertilizer which can be used to assist in crop production.

Example 4

Some dairy farms use zinc chloride ($ZnCl_2$) as an antibacterial solution, rather than copper sulfate. An experiment was performed using the methods described above to determine if a similar result could be achieved using a zinc chloride sample.

A sample of antibacterial solution was obtained from a dairy farm; the sample was a 35 gallon premixed solution of zinc chloride, containing 34 gallons of water. A similar solution was created on a smaller scale having 7.1 mL of the zinc chloride solution and 243 mL of deionized water. The pH of the zinc chloride solution was 0.3, after the addition of the water the pH was 6. An electrolysis reaction was performed using a zinc electrode and two platinized titanium electrodes. The electrolysis reaction began at 200 volts and 10 amperes, and was increased to 18 amperes after a predetermined period of time. In less than 10 minutes a large amount of elemental zinc was recovered and the solution became colorless. After electrolysis the pH of the remaining solution was 5.6.

Example 5

Some dairy farms use zinc sulfate ($ZnSO_4$) as an antibacterial solution. An experiment was performed using the methods described above to determine if a similar result could be achieved using a zinc sulfate sample A sample of zinc sulfate antibacterial solution was obtained from a farm in northern Colorado. The sample included about 7.14 mL of zinc sulfate solution and was added to 243 mL of deionized water. A method for metal extraction was performed in accordance with the methods disclosed herein; however a zinc cathode was used in lieu of a copper cathode. After the electrolysis reaction is complete, the pH of the solution is determined to be 6. The elemental zinc extracted from the solution is then measured to determine the extraction efficiency of the method on a zinc sulfate solution. The present experiment resulted in an extraction efficiency of greater than about 95%.

Example 6

An experiment was performed to remove elemental copper from a 5% copper sulfate solution, prepared in the laboratory. A platinized titanium inert electrode was used as the anode and a pure copper electrode was used as the cathode. Five samples were made and each tested individually to determine an average extraction rate and purity level. The copper was extracted with an average efficiency of greater than 95% (providing a p-value of p<0.05), and having an average of 99.6% purity for each of the five samples.

During the copper extraction, sulfuric acid was produced. Once the elemental copper was removed from the remaining solution, 5 grams of calcium carbonate was added to each of the 250 mL samples of sulfuric acid solution to raise the pH of the solution from 0.7 to 6.5. The following reaction took place creating calcium sulfonate, otherwise known as gypsum, and water ($CaCO_3 + H_2SO_4 \rightarrow CaSO_4 + CO_2 + H_2O$).

A second objective of the experiment was to determine the feasibility of extracting copper from a copper sulfate antibacterial footbath prior to use and after a plurality of cattle had passed through the footbath. Footbath samples were obtained from a dairy farm in norther Colorado. Samples were obtained prior to use and after 600 head of cattle had passed through the footbath. Both samples were strained in order to remove large debris. In the present experiment, the samples were strained through four layers of cheese cloth.

The samples were put through an electrochemical extraction process to remove elemental copper from the solution. The sample that was obtained after the footbaths has been used foamed during the extraction process, likely due to protein contaminants in the solution. Such protein contaminants could be denatured as the pH of the solution rose as copper is extracted and sulfuric acid is created. The extraction efficiency of each sample was determined after the electrochemical process was complete. It was determined that the copper extraction from the used footbath was significantly reduced, by over 23% (p<0.05), as compared to the sample taken prior to usage of the footbath.

The data obtained from the present experiment indicated that it is feasible to extract copper from copper sulfate footbaths and to convert the sulfuric acid generated by the electrolysis into calcium sulfate and water. It is believed that there is a correlation between the number of cattle that had passed through the copper sulfate footbath and the extraction efficiency. It is believed that the larger number of cows that pass through the footbath, the lower the extraction efficiency.

Example 7

An experiment was performed in order to determine the effect of an increased number of cattle on the pH of the solution and the extraction efficiency of the methods disclosed herein.

Multiple samples were obtained from a dairy farm at various points throughout the treatment process. Specifically, samples were obtained from the footbath prior to use, then again after 150, 300, 450, and 600 cows had walked through the footbath (e.g., $T_0$-$T_4$). Each of the samples was filtered in order to remove particulate, such as large feed particles. In the present Example, the samples were filtered through four layers of cheese clothes. After the filtering, twelve 10 mL samples were obtained from each of the above collection periods. A pH was determined for each of the samples.

The present Example was used to determine whether additional processing, such as autoclaving or centrifugation, can have an effect on the pH and/or copper solubility of the solution. Six 10 mL samples from each collection period are autoclaved and the other six samples were not autoclaved. As used herein, the term "autoclave" refers to a method of heating a solution to extreme temperatures in an autoclave device. After the autoclaving process is completed, the pH of the samples is taken again.

Next three of the six autoclaved samples were centrifuged; the remaining 3 autoclaved samples and all of the non-autoclaved samples are not centrifuged. The centrifugal process is performed at 1000× g at room temperature for a period of 25 minutes. Following the centrifugal process, the pH of each of the samples were determined and a 1 mL subsample was obtained from each of the twelve samples and added to 4 mL of 12 molar (M) hydrogen chloride (HCl) for copper analysis via inductively coupled plasma mass spectrometry (ICP). In total, 60 samples were processed for ICP analysis. The effect of the additional processing on the pH value of the samples is shown below in Table 3, below.

TABLE 3

|  | Number of Cows | | | | |
| --- | --- | --- | --- | --- | --- |
|  | 0 | 150 | 300 | 450 | 600 |
| pH | 1.71 | 1.66 | 1.76 | 1.90 | 2.31 |
| Autoclave: | | | | | |
| Yes | 1.73 | 1.66 | 1.81 | 1.89 | 2.19 |
| No | 1.83 | 1.63 | 1.68 | 1.86 | 2.25 |
| Centrifuge: | | | | | |
| Yes | 1.81 | 1.66 | 1.73 | 1.83 | 2.17 |
| No | 1.74 | 1.62 | 1.76 | 1.91 | 2.26 |

Figure 7:
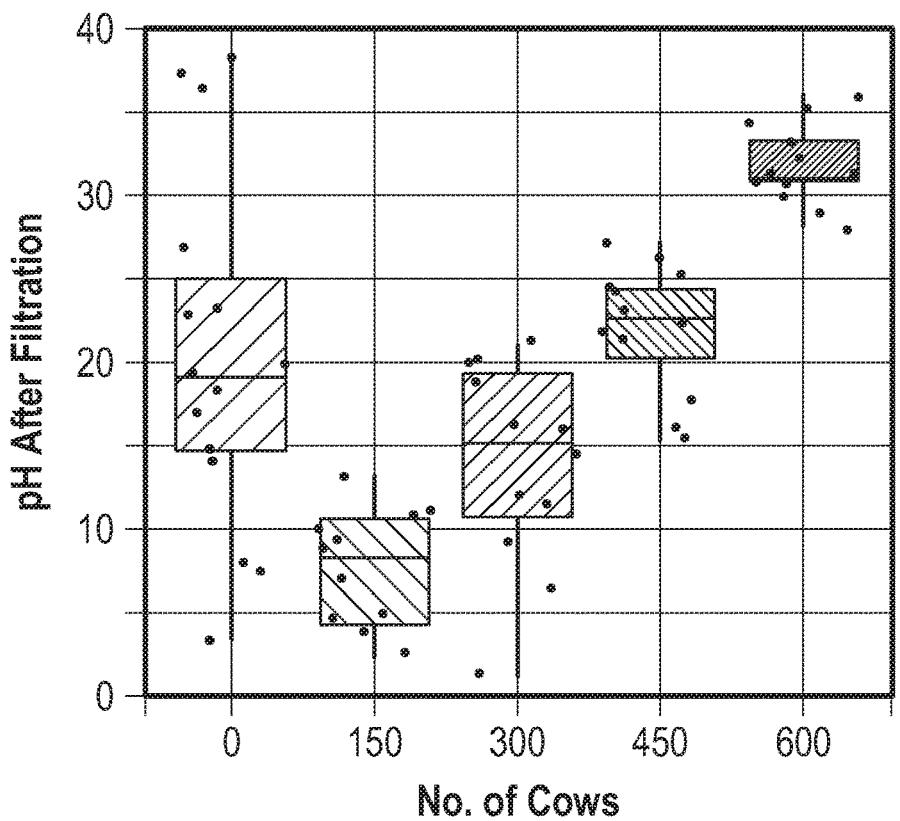
FIG. 7 is a graph illustrating the effect of cattle on the pH of the final antibacterial solution.

FIG. 7 illustrates the effect of the number of cows on the pH of the solution. As shown, the solution becomes more acidic after the first 150 cows but then gradually becomes more basic as additional cows pass through the footbath solution. The data was also evaluated using one-way analysis of variance (ANOVA) to determine the statistical significance of the effect on the pH, the data is shown in Table 4, below.

TABLE 4

|  | Df | Sum Sq | Mean Sq | F value | Pr (>F) |
| --- | --- | --- | --- | --- | --- |
| No. of Cows | 4 | 4027.65 | 1006.91 | 23.36 | 0.0000 |
| Residuals | 58 | 2500.07 | 43.10 | | |

The initial drop in pH was determined to be most likely due to improper agitation of the footbath when the acid was added. For example, as the first set of 150 cows passed through the footbath the solution was agitated enough to become homogenous and provide a more accurate pH.

Figure 8:
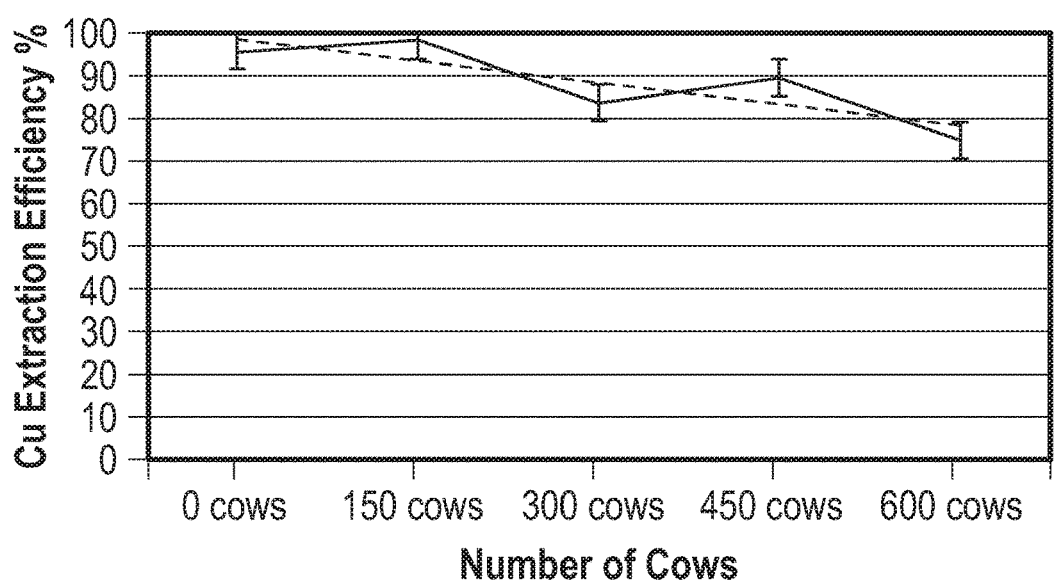
FIG. 8 is a graph illustrating the effect of cattle on copper extraction efficiency.

Additionally, the effect of the number of cattle was determined on the copper extraction efficiency. The extraction efficiencies of each time period $T_0$ to $T_4$ were determined to be 95.7%, 98.4%, 83.7%, 89.6%, and 74.8%, respectively. A graph indicating the effect of cattle on extraction efficiency is shown in FIG. 8. As indicated, there is a significant drop in extraction efficiency after 150 cattle have passed through the solution. Therefore, it was determined the ideal time to remove the antibacterial solution for copper extraction is after 150 cattle have passed through the footbath.

Example 8

An experiment was performed in order to determine the ability to regenerate copper sulfate from used footbath solution.

In this experiment, a plastic footbath about 200 liters in volume was filled with only water from the farm water supply. The water footbath was placed prior to a copper sulfate footbath and then cattle are allowed to walk through the water and copper sulfate footbaths. It has been shown that allowing cattle to walk through a clean water bath prior to entering the antibacterial solution can aid in removing debris and can improve the longevity and effectiveness of the antibacterial solution. Prior to any cows walking through the footbaths, a 5 liter sample is taken from the copper sulfate footbath. After 150 cows went through the two footbaths, a 2 liter sample of the water footbath was taken for analysis.

A 100 mL sample of the starting sample of the copper sulfate footbath solution is evaluated for an initial pH and copper concentration. An electrolysis reaction was performed for approximate 20 minutes at 10 amperes and 15 volts. Once the electrolysis is completed, the elemental copper is scraped from the cathode and the anode is removed from the remaining solution. The elemental copper is replaced in the sulfuric acid and an oxidizing agent is introduced in order to trigger regeneration of the copper sulfate crystals. After regeneration, 100 mL of the water footbath sample, containing no copper sulfate, were mixed thoroughly.

The extraction and regeneration process was repeated ten times. A sub-sample was obtained after every regeneration procedure prior to the next electrolysis in order to determine the efficacy and bacteriostatic effects of the regenerated copper sulfate. An analysis of the experiments showed no difference in efficacy or bacteriostatic effects between the regenerated copper sulfate samples and the conventional copper sulfate with respect to the tested bacteria.

Example 9

Two sub-experiments were performed to test the copper solubility and antimicrobial effectiveness of regenerated copper sulfate. In the first sub-experiment, samples of a copper sulfate footbath solution were obtained from the northern Colorado dairy farm described in Experiment 8. The samples were again taken at intervals of 0, 150, 300, 450, and 600 cattle. The samples were filtered to remove large debris as described above.

After filtration, twelve 10 mL sub-samples were obtained from each collection period (e.g., resulting in 60 samples), and tested to determine a starting pH for each of the sub-samples. Six of the samples from each collection period were autoclaved (e.g., 30 samples were autoclaved), while the other rest of the samples were not autoclaved. The pH of each of the 60 samples was taken. Three of the autoclaved samples and three of the non-autoclaved samples from each time period were centrifuged at room temperature (e.g., 15 samples were autoclaved and centrifuged, and 15 samples were only centrifuged). After the centrifuge, the pH of each of the 60 samples was determined. The sub-samples now include 15 unaltered samples, 15 centrifuged samples, 15 autoclaved samples, and 15 autoclaved and centrifuged samples. An additional sub-sample is taken from each of the 60 samples to measure copper concentration. The data collected indicated that neither centrifugation nor autoclaving had an impact on copper solubility (SEM=2.94; p<0.05).

The second sub-experiment was designed to determine the antimicrobial effectiveness of regenerated copper sulfate. A plurality of 10 mL mixtures was prepared in 20 mL glass tubes having a 4% copper sulfate footbath solution. The copper sulfate solution was made by combining 4 grams of $CuSO_4 \cdot 5H_2O$ to 100 mL of water. Regenerated copper sulfate solution was made by regenerating copper sulfate three times after making the artificial footbath material in the laboratory from the used water footbath.

A sample of footbath solution was taken prior to use, having 22.7 kg of copper sulfate in 550 liters of deionized water, resulting in a roughly 4% copper sulfate footbath solution. A conventional 4% copper sulfate solution with added sulfuric acid ($4 \times 10^{-3}$/vol) was used; approximately the same amount of acid that a dairy can use in the footbaths (2 liters per 550 liters footbath). The sulfuric acid was obtained from a local dairy farm. The regenerated copper sulfate solution was used to make the 4% copper sulfate solution described above.

Serial 1:2 dilutions were made of each treatment and then all dilutions were autoclaved. The minimum inhibitory concentration (MIC) for each treatment was determined using *Escherichia coli* (*E. coli*) bacteria. The MIC was at a 1:16 dilution for all the treatments with the exception of the acid treatment (SEM=3.62) (P=0.05). For the acid treatment, no bacteria growth was present at our greatest dilution (1:512). To determine the minimum bactericidal concentration (MBC) treatment dilutions of 1:32; 1:16; and 1:8 were plated on Meuller Hinton ready petri dishes and incubated at 37° C. temperature for 24 hours. Colony counts were then performed on each of the petri dishes. The data collected indicate that a dilution of greater than 1:32 is required to determine MBC. As such, there was no significant difference between the treatments. The MIC was considered at a 1:16 dilution for all the treatments with the exception of the sulfuric acid treatment. Since bacterial growth was present on all plates for the treatments, thus the MBC with less diluted solutions were reanalyzed.

While the above embodiments have been described in detail in the foregoing description, the same is to be considered as illustrative and not restrictive in character, it being understood that only some embodiments have been described and that all changes and modifications that come within the spirit of the embodiments are desired to be protected.

What is claimed is:

1. A system for extracting an elemental metal from a solution, the system comprising:
    a basin operable to contain an antibacterial solution, wherein the basin comprises: a pump coupled with a valve and operable to pump the antibacterial solution from the basin to the one or more filtration tanks; an infrared sensor operable to monitor usage of the basin; and
    a plurality of nozzles operable to clean the basin between uses;
    one or more filtration tanks coupled with and operable to receive the antibacterial solution from the basin;
    an electrolysis chamber coupled with the one or more filtration tanks; and
    a storage tank for holding a material.

2. The system of claim 1, further comprising a computing device coupled with each of the basin, the one or more filtration tanks, the electrolysis chamber and the storage tank.

3. The system of claim 2, wherein the computing device further comprises a processor and a memory coupled with the processor and storing instructions thereon which, when executed by the processor, cause the processor to:
    track a usage of the antibacterial solution in the basin,
        pump the antibacterial solution from the basin to the one or more filtration tanks, perform an electrochemical extraction on the antibacterial solution; and produce a metal precipitate and a byproduct in the electrolysis chamber.

4. The system of claim 3, wherein the instructions further cause the processor to:

extract the metal precipitate;

pump the byproduct into the storage tank; and neutralize the byproduct.

5. The system of claim 4, wherein the instructions further cause the processor to:

regenerate the antibacterial solution by introduce an oxidizing agent into the electrolysis chamber.

6. The system of claim 3, wherein the instructions further cause the processor to pump the antibacterial solution from the basin to the one or more filtration tanks when the antibacterial solution in the basin has been used by 150 subjects.

7. The system of claim 1, wherein the one or more filtration tanks further comprise a plurality of mesh baskets, each of the plurality of mesh baskets having a different size mesh.

8. The system of claim 1, wherein the electrolysis chamber further comprises one or more cathodes, one or more anodes, and a power supply source.

9. A method for extracting at least one elemental metal from an antibacterial solution, the method comprising:

obtaining at least 100 liters of an antibacterial solution that has been used to treat at least 100 animals;

performing an electrochemical extraction on the antibacterial solution;

producing a metal precipitate and a byproduct; and collecting the metal precipitate.

10. The method of claim 9, wherein the sample of the antibacterial solution is from about 100 liters to about 1000 liters.

11. The method of claim 9, wherein the antibacterial solution is selected from the group comprising a copper sulfate ($CuSO_4$) solution, a zinc chloride ($ZnCl_2$) solution, and a zinc sulfate ($ZnSO_4$) solution.

12. The method of claim 9, wherein the antibacterial solution is the copper sulfate ($CuSO_4$) solution.

13. The method of claim 9, wherein the metal precipitate is an elemental copper (Cu) and the byproduct is a sulfuric acid solution ($H_2SO_4$).

14. The method of claim 13, further comprising neutralizing the sulfuric acid solution ($H_2SO_4$).

15. The method of claim 14, wherein the neutralization step further comprises introducing a basic material into the sulfuric acid solution ($H_2SO_4$), wherein the basic material is selected from the group comprising a sodium hydroxide (NaOH) solution and a calcium carbonate ($CaCO_3$).

16. The method of claim 15, wherein the basic material is calcium carbonate ($CaCO_3$).

17. The method of claim 16, further comprising converting the sulfuric acid solution ($H_2SO_4$) to gypsum ($CaSO_4 \cdot 2H_2O$).

18. The method of claim 13, further comprising:

replacing the copper (Cu) precipitate into the sulfuric acid solution ($H_2SO_4$);

introducing an oxidizing agent into the copper (Cu) and the sulfuric acid ($H_2SO_4$); and regenerating a fresh copper sulfate ($CuSO_4$).

19. The method of claim 18, where in the oxidizing agent is hydrogen peroxide ($H_2O_2$).

* * * * *